United States Patent
Zhou

(10) Patent No.: US 9,632,231 B2
(45) Date of Patent: Apr. 25, 2017

(54) LIGHT GUIDE PLATE, BACKLIGHT MODULE, AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 251 days.

(21) Appl. No.: 14/412,684

(22) PCT Filed: Dec. 9, 2014

(86) PCT No.: PCT/CN2014/093325
§ 371 (c)(1),
(2) Date: Jan. 4, 2015

(87) PCT Pub. No.: WO2016/082247
PCT Pub. Date: Jun. 2, 2016

(65) Prior Publication Data
US 2016/0356944 A1    Dec. 8, 2016

(30) Foreign Application Priority Data

Nov. 26, 2014   (CN) .......................... 2014 1 0698370

(51) Int. Cl.
G02B 6/00     (2006.01)
F21V 8/00     (2006.01)

(52) U.S. Cl.
CPC ............ G02B 6/0055 (2013.01); G02B 6/00 (2013.01)

(58) Field of Classification Search
CPC ... G02B 6/0055; G02B 6/0036; G02B 6/0043
USPC ........................................................ 362/626
See application file for complete search history.

(56) References Cited

U.S. PATENT DOCUMENTS

2007/0285946 A1* 12/2007 Lin ...................... G02B 6/0036
                                                                    362/615
2014/0104885 A1*  4/2014 Zhang .................. G02B 6/0036
                                                                    362/626

* cited by examiner

*Primary Examiner* — Julie Bannan
(74) *Attorney, Agent, or Firm* — Andrew C. Cheng

(57) ABSTRACT

A light guide plate includes a light exit surface, a reflection surface opposite to the light exit surface, and at least one light incidence surface connecting to the light exit surface and the reflection surface. The reflection surface includes a plurality of minute projection structures projecting toward interior of the light guide plate. Each of the minute projection structures includes at least two side faces coated with a high reflectivity material. The at least two high reflectivity material coated side faces form at least one included angle pointing toward the at least one light incidence surface. The minute projection structures have a distribution density that is decreased with an increase of a distance thereof from the light sources.

12 Claims, 3 Drawing Sheets

LIGHT GUIDE PLATE, BACKLIGHT MODULE, AND DISPLAY DEVICE

CROSS REFERENCE TO RELATED APPLICATIONS

This application claims the priority of Chinese Patent Application No. 201410698370.7, entitled "Light Guide Plate, Backlight Module, and Display Device", filed on Nov. 26, 2014, the disclosure of which is incorporated herein by reference in its entirety.

BACKGROUND OF THE INVENTION

1. Field of the Invention

The present invention relates to the field of displaying technology, and in particular to a light guide plate, a backlight module, and a display device.

2. The Related Arts

In the field of displaying technology, the most commonly seen display devices are liquid crystal displays (LCDs). Liquid crystal polymer used in the liquid crystal displays does not have the property of luminosity and can achieve an effect of displaying relying upon light emitting from a backlight module. Generally, a backlight module comprises a light guide plate and multiple spot light sources. Light emitting from the multiple spot light sources, after being subjected to reflection and scattering by microstructures formed on the light guide plate, is given off in a uniform manner from a light exit surface of the light guide plate. The microstructure of the light guide plate, although providing a bettered effect of light guiding, absorbs a fraction of the light, causing a loss of optical energy.

In the state of the art, on the one hand, due to the loss of light during the transmission thereof, the brightness of light that is given off a portion of the light exit surface of a light guide plate that is distant from a light source is reduced so as to make the light exiting from the light guide plate not uniform; and on the other hand, since a spot light source has a specific light exiting angle, a portion of the light exit surface of a light guide plate that corresponds to a gap between two spot light sources may become a dark zone, further making the light exiting from the light guide plate further non-uniform.

SUMMARY OF THE INVENTION

An embodiment of the present invention provides a light guide plate, a backlight module, and a display device, which help improve uniformity of light exiting from the light guide plate and reduce optic loss.

In a first aspect, an embodiment of the preset invention provides a light guide plate, which comprises a light exit surface, a reflection surface opposite to the light exit surface, and at least one light incidence surface connecting to the light exit surface and the reflection surface, wherein the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, the minute projection structures having a distribution density that is decreased with an increase of a distance thereof from the light sources.

Optionally, the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures.

Optionally, the light guide plate comprises one light incidence surface; and the minute projection structures each comprise two high reflectivity material coated side faces in such a way that the two high reflectivity material coated side faces respectively form two included angles that are less than 90° with respect to the two side surfaces of the light guide plate.

Optionally, the minute projection structures each have a shape of one of a triangular pyramid, a triangular prism, and a triangular frustum.

Optionally, the light guide plate comprises two opposite light incidence surfaces;

the minute projection structures each comprise four high reflectivity material coated side faces; and the four high reflectivity material coated side faces respectively form included angles that are less than 90° with respect to the two side surfaces of the light guide plate.

Optionally, the minute projection structures each have a shape of one of a quadrangular pyramid, a quadrangular prism, and a quadrangular frustum.

Optionally, the minute projection structures have a distance therebetween that is 50 µm-500 µm.

Optionally, the minute projection structures each have a base having an edge length that is 50 µm-100 µm.

In a second aspect, an embodiment of the present invention provides a backlight module, which comprises a light guide plate and a plurality of light sources. The plurality of light sources is distributed along at least one light incidence surface of the light guide plate.

In a third aspect, an embodiment of the present invention provides a display device that comprises a backlight module of the second aspect.

In an embodiment of the present invention, the light guide plate comprises a plurality of minute projection structures formed on a surface thereof that is opposite to the light exit surface to reflect incident light to locations corresponding to gaps between light sources in a direction away from the light sources to prevent dark zones from forming on the light guide plate. The minute projection structures are arranged with a distribution density that is decreased with increase of the distance thereof from the light sources so as to reduce loss caused by light being absorbed at locations that are away from the light sources, while achieving enhanced reflection at locations close to the light sources to reflect more light toward a direction away from the light sources to further improve uniformity of exiting light of the light guide plate.

BRIEF DESCRIPTION OF THE DRAWINGS

To more clearly explain the technical solution proposed in an embodiment of the present invention and that of the prior art, brief descriptions of the drawings that are necessary for describing the embodiment or the prior art are given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Embodiments of the present invention provide a light guide plate, a backlight module, and a display device, which help improve uniformity of light exiting from the light guide plate and reduce optic loss. A detailed description will be given to the embodiments of the present invention with reference to the attached drawings.

Figure 1:
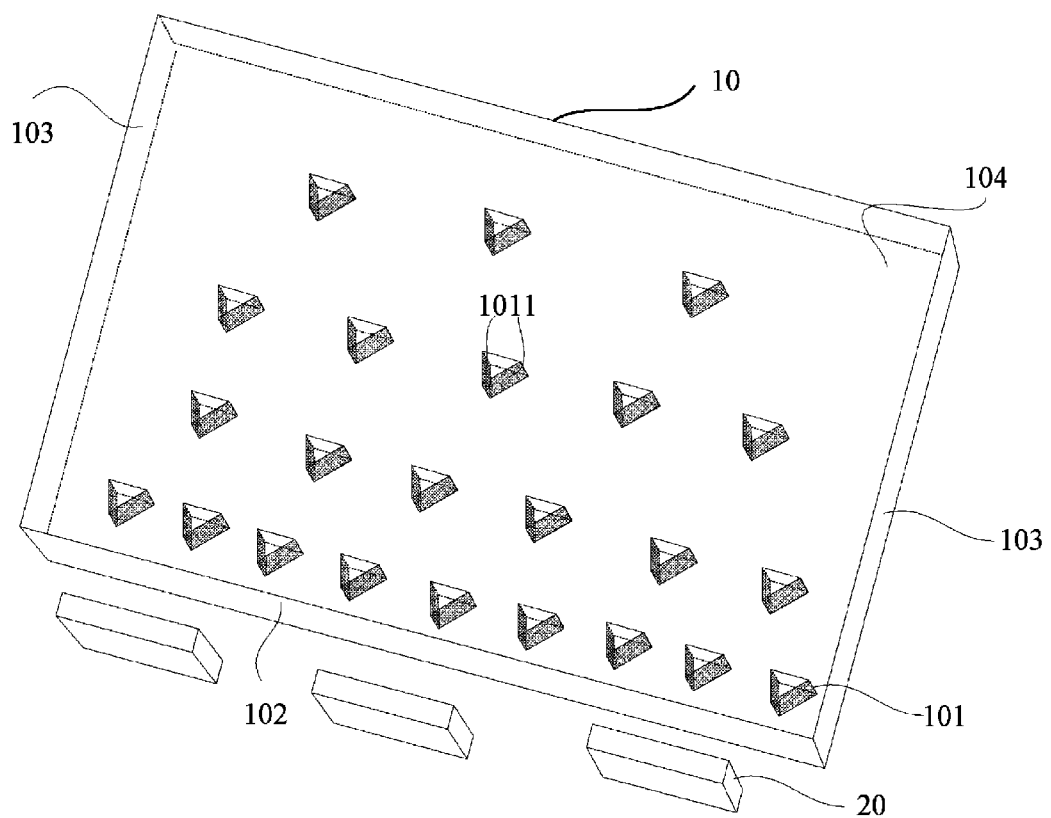
FIG. 1 is a schematic view showing the structure of a light guide plate according to an embodiment of the present invention.

Referring to FIG. 1, a schematic view is given to illustrate an example of a light guide plate according to an embodiment of the present invention. As shown in FIG. 1, the light guide plate 10 comprises a light exit surface, a reflection surface 104 that is opposite to the light exit surface, and at least one light incidence surface 102 connected to the light exit surface and the reflection surface 104. The reflection surface 104 comprises a plurality of minute projection structures 101 projecting toward interior of the light guide plate 10. Each of the minute projection structures 101 comprises at least two side faces 1011 coated with a high reflectivity material. The at least two high reflectivity material coated side faces 1011 define at least one included angle pointing toward the at least one light incidence surface 102. The minute projection structures 101 are arranged to have a distribution density thereof reduced with the distance thereof from the light sources 20. In other words, the closer the minute projection structures 101 are to the light sources 20, the distribution density thereof is larger.

Figure 2:
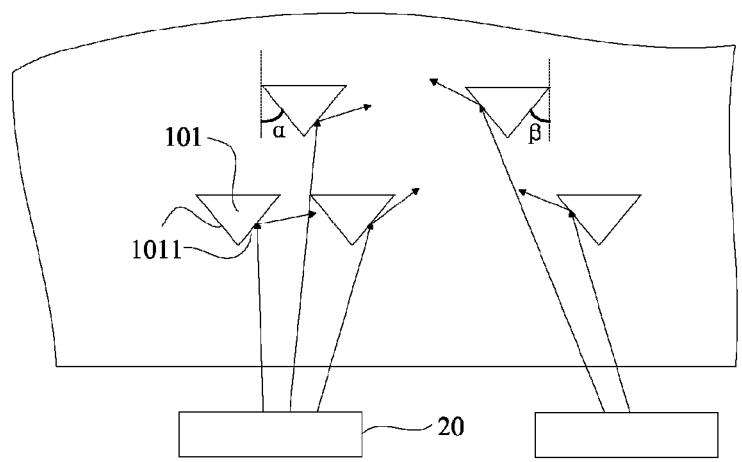
FIG. 2 is a schematic view showing the structure of a light guide plate according to another embodiment of the present invention.

Referring also to FIG. 2, as shown in FIG. 2, the light sources 20 emitting light that, after being reflected by the at least two side faces 1011 of the minute projection structure 101, irradiate in a direction toward a location corresponding to a gap between the light sources 20 and away from the light sources 20 so as to enhance the exiting light brightness at the location of the light guide plate corresponding to the gap between the light sources 20 and thus preventing the formation of a dark zone.

In an embodiment, the high reflectivity material coated on the two side faces 1011 of the minute projection structure 101 provides an effect of absorbing light and thus, light that enters the light incidence surface 102 is subjected to reflection and partial absorption by the plurality of minute projection structures 101 so that light that reaches an interior portion of the light guide plate 10 that is distant from the light sources 20 is such that the brightness thereof is lower than that at a portion close to the light sources 20. By reducing the density of the minute projection structures 101 at a location that is distant from the light sources 20, the loss of light resulting from absorption at the location distant from the light sources 20 is reduced thereby reducing a difference of exiting light brightness between a portion of the light guide plate 10 that is distant from the light sources 20 and that is close to the light sources 20 and thus enhancing uniformity of exiting light. The density of the minute projection structures 101 being greater at a location closer to the light sources 20 makes it possible to better reflect light to the location that corresponds to the gap between the light sources 20 and the location away from the light sources so as to help improve uniformity of exiting light of the light guide plate.

Further, as shown in FIG. 2, the two side faces 1011 of the minute projection structure 101 that are coated with the high reflectivity material respectively define included angles, $\alpha$ and $\beta$, with respect to two side surfaces 103 of the light guide plate 10 and both angles, $\alpha$ and $\beta$, are less than 90°.

In some feasible embodiments, the light guide plate 10 comprises one light incidence surface 102; and in this condition, the minute projection structures 101 each comprise two side faces 1011 coated with the high reflectivity material and the two high reflectivity material coated side faces 1011 respectively define included angles that are less than 90° with respect to the two side surfaces 103 of the light guide plate 10 and the two high reflectivity material coated side faces 1011 define an included angle pointing towards the light incidence surface 102.

Optionally, the minute projection structures 101 may have a shape that is at least one of a triangular pyramid, a triangular prism, and a triangular frustum.

Figure 3:
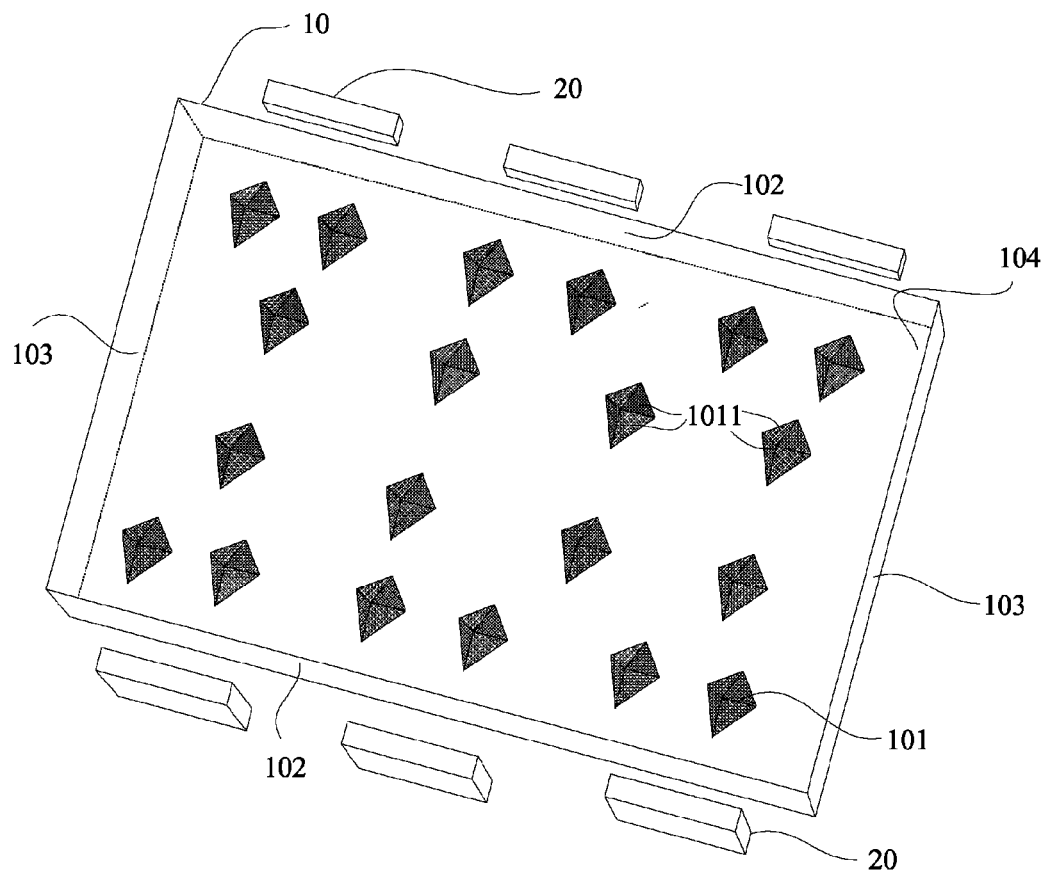
FIG. 3 is a schematic view showing the structure of a light guide plate according to a further embodiment of the present invention.

In another feasible embodiments, as shown in FIG. 3, the light guide plate 10 comprises two opposite light incidence surfaces 102; and in this condition, the minute projection structures 101 comprises four side faces 1011 that are coated with a high reflectivity material and the four high reflectivity material coated side faces 1011 respectively define include angles that are less than 90° with respect to two side surfaces 103 of the light guide plate 10 and the four high reflectivity material coated side faces 1011 define two included angles respectively pointing toward the two opposite light incidence surfaces 102.

Optionally, the minute projection structures 101 may have a shape that is at least one of a quadrangular pyramid, a quadrangular prism, and a quadrangular frustum.

In an embodiment, to prevent light from being further weakened at the location correspond to the gap between the light sources 20, the minute projection structures 101 may be arranged to correspond to the light sources 20. Specifically, the minute projection structures 101 that are arranged at locations corresponding to the gaps between the light sources 20 of the light guide plate 10 have a smaller density or no minute projection structure 101 is arranged at a location corresponding to the gap between the light sources 20 of the light guide plate 10.

Figure 4:
FIG. 4 is a schematic view showing the structure of a light guide plate according to yet a further embodiment of the present invention.

In an embodiment, as shown in FIG. 4, the light sources 20 are respectively set at two opposite light incidence surface 102 of the light guide plate 10 in a manner of being alternate with each other.

In an embodiment, a distance between the minute projection structures 101 is set to be 50 µm-500 µm. An edge length of a base of the minute projection structure 101 can be set to be 50 µm-100 µm. The base of the minute projection structure 101 is a side of the minute projection structure 101 that intersects the reflection surface 104 of the light guide plate 10.

The light guide plate according to embodiments of the present invention comprises a plurality of minute projection structures formed on a surface thereof that is opposite to the light exit surface to reflect incident light to locations corresponding to gaps between light sources in a direction away from the light sources to prevent dark zones from forming on the light guide plate. The minute projection structures are arranged with a distribution density that is decreased with increase of the distance thereof from the light sources so as to reduce loss caused by light being absorbed at locations that are away from the light sources, while achieving enhanced reflection at locations close to the light sources to reflect more light toward a direction away from the light sources to further improve uniformity of exiting light of the light guide plate.

Correspondingly, an embodiment of the present invention further provides a backlight module and the backlight module comprises a light guide plate of one of the embodiments shown in FIGS. 1-4.

Correspondingly, an embodiment of the present invention further provides a display device and the display device comprises the above-described backlight module.

The backlight module and display device provided by the present invention may reflect light to locations that correspond to gaps between light sources in a direction away from the light sources and reduce loss resulting from light being absorbed at locations of the light guide plate away from the light sources and thus enhance uniformity of light emitting therefrom.

The embodiments illustrated above are not construed as limiting the scope of protection of the technical solutions. Modifications, equivalent substitutions, and improvements that are made without departing from the spirits and principles of the above-described embodiments are considered within the scope of protection of the technical solutions.

What is claimed is:

1. A light guide plate, comprising a light exit surface, a reflection surface opposite to the light exit surface, and at least one light incidence surface connecting to the light exit surface and the reflection surface, wherein the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, the minute projection structures having a distribution density that is decreased with an increase of a distance thereof from the light sources; and the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures;

wherein the light guide plate comprises two opposite light incidence surfaces;

the minute projection structures each comprise four high reflectivity material coated side faces; and the four high reflectivity material coated side faces respectively form included angles that are less than 90° with respect to the two side surfaces of the light guide plate.

2. The light guide plate as claimed in claim 1 wherein the minute projection structures each have a shape of one of a quadrangular pyramid, a quadrangular prism, and a quadrangular frustum.

3. The light guide plate as claimed in claim 1, wherein the minute projection structures have a distance therebetween that is 50 μm-500 μm.

4. The light guide plate as claimed in claim 1, wherein the minute projection structures each have a base having an edge length that is 50 μm-100 μm.

5. A backlight module, comprising a light guide plate and a plurality of light sources distributed along at least one light incidence surface of the light guide plate, the light guide plate comprising a light exit surface, a reflection surface opposite to the light exit surface, and at least one light incidence surface connecting to the light exit surface and the reflection surface, wherein the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, the minute projection structures having a distribution density that is decreased with an increase of a distance thereof from the light sources; and the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures; and wherein the light guide plate comprises two opposite light incidence surfaces;

the minute projection structures each comprise four high reflectivity material coated side faces; and the four high reflectivity material coated side faces respectively form included angles that are less than 90° with respect to the two side surfaces of the light guide plate.

6. The backlight module as claimed in claim 5, wherein the minute projection structures each have a shape of one of a quadrangular pyramid, a quadrangular prism, and a quadrangular frustum.

7. A display device, comprising at least one backlight module, the backlight module comprising a light guide plate and a plurality of light sources distributed along at least one light incidence surface of the light guide plate, the light guide plate comprising a light exit surface, a reflection surface opposite to the light exit surface, and at least one light incidence surface connecting to the light exit surface and the reflection surface, wherein the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, the minute projection structures having a distribution density that is decreased with an increase of a distance thereof from the light sources; and the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures;

wherein the light guide plate comprises two opposite light incidence surfaces;

the minute projection structures each comprise four high reflectivity material coated side faces; and the four high reflectivity material coated side faces respectively form included angles that are less than 90° with respect to the two side surfaces of the light guide plate.

8. The display device as claimed in Claim 7, wherein the minute projection structures each have a shape of one of a quadrangular pyramid, a quadrangular prism, and a quadrangular frustum.

9. The backlight module as claimed in claim 5, wherein the minute projection structures have a distance therebetween that is 50 μm-500 μm.

10. The backlight module as claimed in claim 5, wherein the minute projection structures each have a base having an edge length that is 50 μm-100 μm.

11. The display device as claimed in claim 7, wherein the minute projection structures have a distance therebetween that is 50 μm-500 μm.

12. The display device as claimed in claim 7, wherein the minute projection structures each have a base having an edge length that is 50 μm-100 μm.

* * * * *